E. E. ELLMANN.
BOLT LOCK.
APPLICATION FILED SEPT. 15, 1911.
1,033,163.
Patented July 23, 1912.
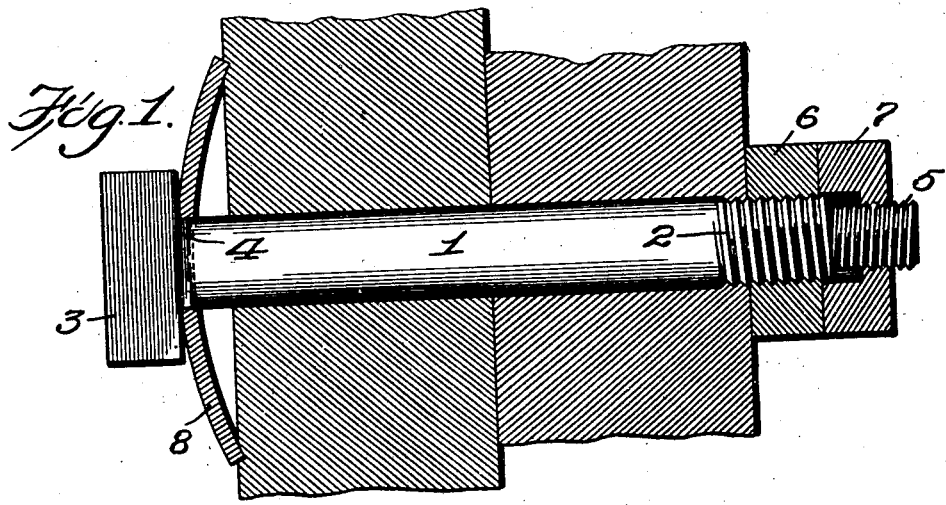
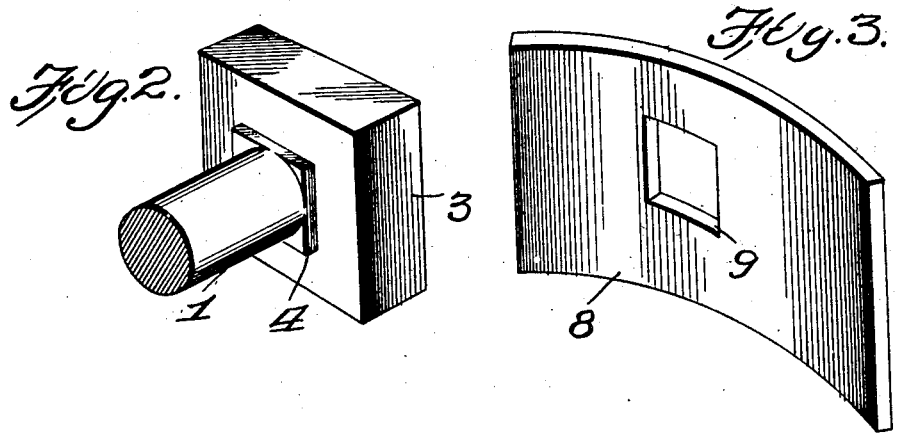
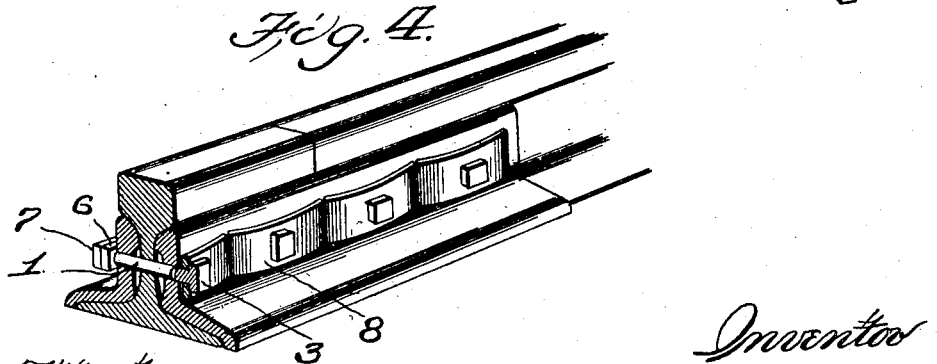
Attest:
E. L. Wallace
N. G. Butler
Inventor
Ernest E. Ellmann
by Higdon & Longan Attys.

UNITED STATES PATENT OFFICE.

ERNEST E. ELLMANN, OF ST. LOUIS, MISSOURI, ASSIGNOR OF FIFTY-ONE ONE-HUNDREDTHS TO CLARENCE D. JOHNSON, OF ST. LOUIS, MISSOURI.

BOLT-LOCK.

1,033,163.  Specification of Letters Patent.  Patented July 23, 1912.

Application filed September 15, 1911.  Serial No. 649,451.

*To all whom it may concern:*

Be it known that I, ERNEST E. ELLMANN, a citizen of the United States, and resident of St. Louis, Missouri, have invented certain new and useful Improvements in Bolt-Locks, of which the following is a specification containing a full, clear, and exact description, reference being had to the accompanying drawings, forming a part hereof.

My invention relates to improvements in bolt locks, and the object of my invention is to construct a simple, inexpensive and efficient means to prevent bolts from turning.

With the above purpose in view my invention consists in certain novel features of construction and arrangement of parts as will be hereinafter more fully described, pointed out in the claim and illustrated by the accompanying drawings, in which—

Figure 1 illustrates, in section, my invention as applied to a wooden structure; Fig. 2 is a perspective, partly in section, of my improved bolt head; Fig. 3 is a perspective of my improved locking washer; and Fig. 4 illustrates my invention as applied upon a rail joint.

Referring by numerals to the accompanying drawings: 1 designates the body of the bolt, a portion of which adjacent one end is provided with a right hand thread 2. At the opposite end of the bolt there is the ordinary bolt head 3. At the base of the body of the bolt 1 next adjacent the head 3 there is an angular, projecting shoulder 4. Formed integral with the threaded end of the bolt there is a reduced portion 5 having thereon a left hand thread.

6 designates an ordinary nut which is provided with an internal right hand thread to be secured over the bolt upon the right hand threads 2.

7 designates a jam nut having an opening therethrough of different diameters, the larger portion of which is of approximately the same diameter as the diameter of the body portion of the bolt so that the jam nut 7 may be moved over the threads 2. The portion of least diameter is provided with internal left hand threads.

8 designates my improved locking washer which consists of an angular piece of spring steel, preferably rectangular, which is longitudinally curved so that its end margins will engage in the work and if used upon wooden structures embed in the work with sufficient bite to prevent turning of the washer. Located in the approximate center of the washer there is an opening 9 shaped to conform with the angular shoulder 4 upon the inside face of the bolt head.

In Fig. 4 I illustrate a number of the washers as applied to a number of alining bolts, the washers interengaging at their end margins so as to be prevented from turning.

It is to be observed that the shoulder 4 is of less thickness than the thickness of the washer so that, if the bolt is drawn in a position to completely flatten out the washer, the shoulder 4 will not engage the work.

I claim:

In combination with a bolt having a portion, adjacent its head, non-circular in cross section, an elastic metallic washer having a non-circular opening and two opposing margins of the washer lying in planes removed from the plane of the opening.

In testimony whereof, I have signed my name to this specification, in presence of two subscribing witnesses.

ERNEST E. ELLMANN.

Witnesses:
E. L. WALLACE,
N. G. BUTLER.